March 11, 1941. T. CARROLL 2,234,465
ELEVATING DEVICE FOR COMBINES
Filed Oct. 30, 1939
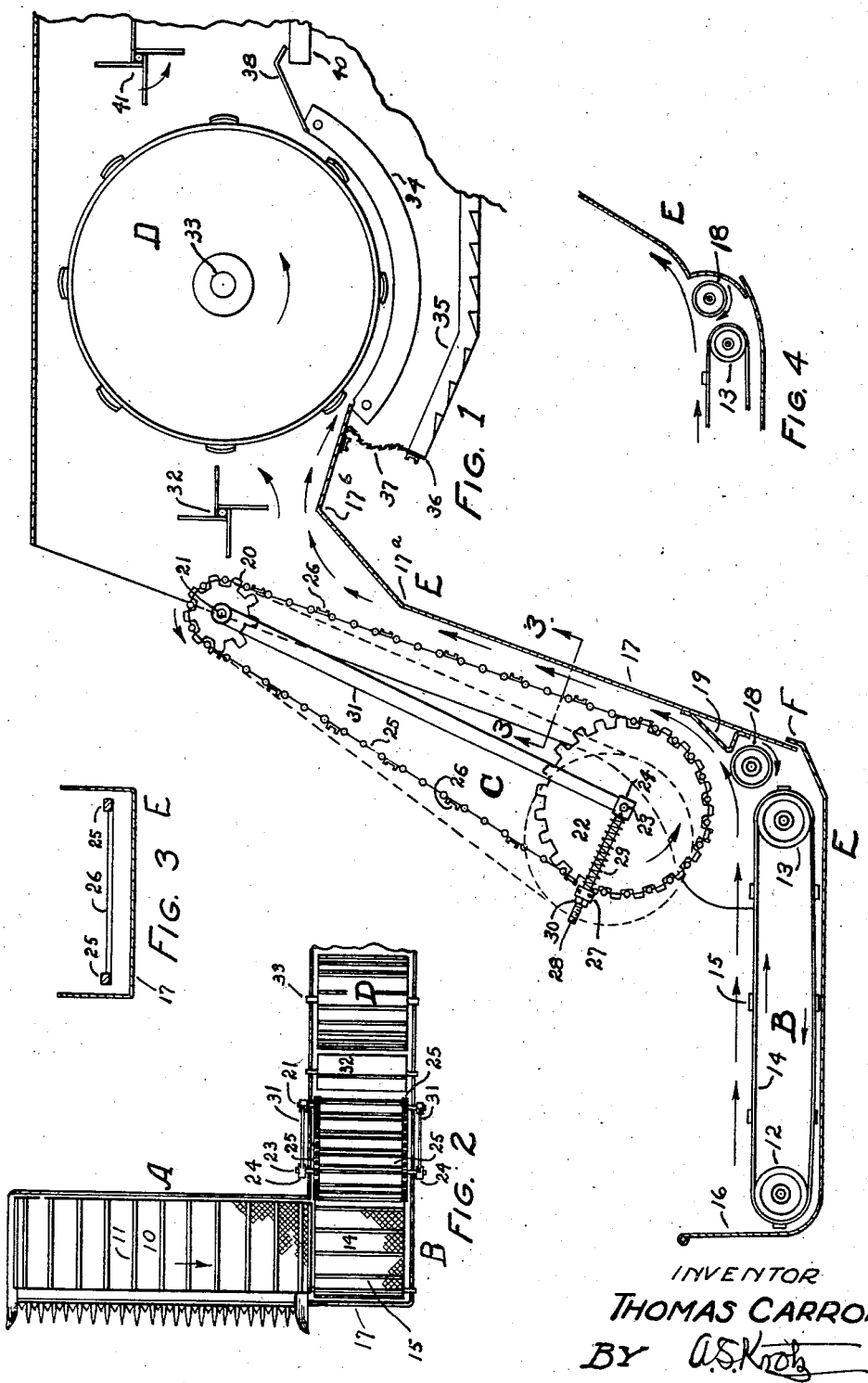
INVENTOR
THOMAS CARROLL
BY A.S.Kroh
ATTORNEY Patented Mar. 11, 1941

2,234,465

UNITED STATES PATENT OFFICE 2,234,465

ELEVATING DEVICE FOR COMBINES

Thomas Carroll, Toronto, Ontario, Canada, assignor to Massey-Harris Co. Ltd., Toronto, Ontario, Canada, a corporation of Canada Application October 30, 1939, Serial No. 301,877

7 Claims. (Cl. 56—123)

The present invention relates to a grain elevating device for harvester combines and the like wherein the grain is conveyed transversely from the cutting mechanism to longitudinal devices which convey the grain rearwardly and then elevate it to the threshing cylinder.

Other objects of the present invention are to simplify and reduce the cost of devices of the class and provide a device which will be more efficient and reliable than conventional devices.

Some combines of the class have their threshing cylinder positioned low down and the grain and straw are elevated to the separating and cleaning devices after passing the threshing cylinder.

The present device was devised to economically move the grain to a cylinder which is positioned considerably above and somewhat in rear of the cutter bar and wherein the grain is elevated vertically or nearly so, thus to reduce the length of the threshing unit.

One of the objects of the present invention is to prevent the loss of grain by using a continuous trough which extends under the conveyors for their length to the concave, thus to effectively prevent any grain from being lost.

Another object is to provide a means for definitely and positively elevating the grain by means of a single endless chain elevator which will automatically adjust itself to the quantity of grain being elevated.

A further object of my invention is to provide a trough shape between the elevator and cylinder and under the beater which causes the grain to make a free and easy right angle turn in a manner which prevents clogging and bunching.

To these and other useful ends my invention consists of parts, combinations of parts, or their equivalents, and mode of operation, as hereinafter set forth and claimed and shown in the accompanying drawing in which:

Fig. 1 is a side diagramatic view of my improved device.

Fig. 2 is a top fractional view of a combine illustrating the position of the longitudinal conveyor and the elevating device in relation to the cutter bar and its conveyor.

Fig. 3 is a view of the trough and elevator taken on line 3—3 of Figure 1.

Fig. 4 illustrates a modification.

It is thought unnecessary to show further details of the thresher combine because the application of various devices on combines of the class is too well known to require detail description and illustration.

In the present invention, the cutter bar and its conveyor in their entirety are designated by reference character A. The horizontal conveyor is designated in its entirety by reference character B and the main elevating device is, in its entirety, designated by reference character C.

The threshing cylinder of the device, including its concave, is designated in its entirety by reference character D. The trough for members B, C and D is designated in its entirety by reference character E.

Member A may be of any conventional design, the general construction of which is well known. Member A is provided with a belt conveyor 10 having cross slats 11, the upper half moving in the direction indicated by arrow and adapted to convey and deliver the grain to member B by reason of suitable connections between members A and B. Member B comprises front and rear rollers 12 and 13, roller 13 being driven by suitable connections from other moving parts of the combine.

Conveyor belt 14 operatively engages rollers 12 and 13 and is provided with a suitable number of spaced cross slats 15 and is moved in the direction indicated by arrows. Thus the grain delivered to member B by member A will be moved rearwardly to the elevating device which comprises the endless elevator C, a part of trough E and other cooperating means as will hereinafter appear.

Trough E is shaped longitudinally as illustrated in Figure 1 and transversely generally as illustrated in Figure 3. The trough is provided with suuitable side panels (see Figure 3). The front end of member E extends upwardly in front of member B as at 16 providing a front shield for this member. Thus member 16 and the side panels will prevent any grain from falling to the ground for the entire length of the trough. Member B is arranged to remain preferably on the same plane as member A and is hinged on the axis of member 13 so platform A and member B at their front ends may be raised and lowered independent of the combine frame. Member E is telescoped for movement as at F in a manner which will permit the movement of member B on the axis of roller 13 but will prevent the loss of grain through the loose joint thus formed. The middle portion 17 of trough E extends upwardly and slightly rearwardly as illustrated, the bottom terminating preferably as at 17ᵃ the bottom continuing from this point at a greater angle terminating preferably as at 17ᵇ from which point it extends rearwardly and downwardly and terminates at the front end of the concave. Clearly the trough from 17ᵃ to the concave may be curved so as to operate similar to the design shown.

I provide a roller 18 which is rotatably mounted and driven in the direction indicated by curvilinear arrow and is positioned adjacent the rear end of member B the top being somewhat above the top plane of this member. I position and secure a guiding bracket 19 on trough E preferably as illustrated in Figure 1.

By scrutinizing Figure 1 it will be seen that roller 18 will assist the grain to turn upwardly and bracket 19 will act to complete the movement of the grain into the vertical portion of the trough where it is carried upward by member C.

Roller 18 acts to prevent the grain from dropping in front of roller 18 and guiding member 19 acts to prevent the grain from dropping behind roller 18. In other words, the grain that is fed rearwardly by belt 14 will naturally travel as indicated by arrows and with very little resistance being offered to its passage. Clearly member 19 may be integrally formed with the trough as illustrated in Figure 4.

Member C comprises spaced sprockets 20—20 which are mounted on and driven by a shaft 21 in the direction indicated by curvilinear arrow. Spaced sprockets 22—22 are mounted on shaft 23 the shaft being rotatably mounted at each end in bearings 24—24. These bearings are held in spaced relation to sprockets 20 by means of arms 31—31 which are pivoted at their upper ends preferably concentric with shaft 21.

I provide preferably chain belts 25—25 which operatively engage sprockets 20 and 22 and having a suitable number of spaced cross flights 26.

I provide stationary anchors 27—27 which are secured to the frame of the combine or to the side panels of member E. Bolts 28 are secured to bearing blocks 24 and extend freely through blocks 27 and having mounted thereon a pressure spring 29. A nut 30 is provided on the end of bolt 28 whereby the lowest position of sprockets 22 may be adjusted relative to the bottom of trough E. Thus it will be seen that sprockets 22 will be spring held toward member 19 and may be positioned any desired minimum distance from this member by means of nuts 30.

Clearly the elevating device C will automatically adjust itself to the quantity of grain delivered to it and it may be adjusted close enough to member 19 to convey the smallest or largest quantity of grain upwardly without unnecessary strain on the mechanism or unnecessary wasting of power.

In the design shown, I have indicated by a number of arrows the direction taken by the grain from the end conveyor to the threshing cylinder and as illustrated by dotted lines a raised position of the lower end of the elevator C. I suitably position a beater 32 between sprockets 20 and threshing cylinder D. This beater is turned in the direction indicated by curvilinear arrow. Clearly the grain passing over the upper end of member E will be assisted in its movement toward cylinder D by beater 32.

Clearly the shape of the upper end of member E and the position of elevator C and beater 32 relative to cylinder D forms a curved and easy path for the grain. That is, the grain will be caused to turn at right angles without restriction and the elements will act to keep the grain moving and prevent it from clogging or bunching. This is one of the important features in my device without which it would require complicated mechanism and considerable room between elevator C and cylinder D, which, at best, would operate less efficiently than my device.

As indicated, the cylinder is conventional and turns in the direction indicated by curvilinear arrow on shaft 33 and having a concave 34 which may also be conventional.

I provide a shaker plate 35, the upwardly extending end 36 having a canvas connection 37 to the rear end of trough E as illustrated. Thus any grain which passes under or through concave 34 will be delivered to the cleaning device of the combine. At the rear end of member 34 I secure a guide plate 38 which is adapted to guide the straw to the straw rack 40, a fraction only of which is shown. I provide preferably a beater 41 which is located as illustrated and turns in the direction indicated in Figure 1. Thus means are provided for directing the material rearwardly on member 40.

It will be seen that member E is made continuous and has the usual side panels which may be the side panels of the harvester so once the grain is delivered to conveyor B, it cannot be lost but will be fed directly to the threshing cylinder.

Thus it will be seen that I have provided a very efficient, simple and easily operated elevating device for combines, that the device is positive and designed so it will be impossible to clog and having means for self adjustment to all conditions.

In Figure 4 I illustrate a slight modification wherein bracket 19 is formed integral with member E. The operation of this device will clearly be exactly like the operation of the device shown in Figure 1.

Clearly many minor detail changes may be made without departing from the spirit and scope of the present invention as recited in the appended claims.

Having thus shown and described my invention, I claim:

1. A combine conveying and elevating device of the class described, comprising a cutter bar having a transverse conveyor, a relatively short longitudinal conveyor adapted to receive the grain from said transverse conveyor, a threshing cylinder having a concave thereunder and being positioned considerably above the horizontal plane and somewhat in rear of said longitudinal conveyor, a trough positioned under said longitudinal conveyor extending upwardly and rearwardly and then downwardly and rearwardly a short distance terminating at the forward end of said concave, a roller positioned adjacent the delivery end of said longitudinal conveyor and adapted to turn and urge the grain upwardly and rearwardly into the bottom of said trough, an endless conveyor positioned in the upwardly extending part of said trough and extending a distance above the upper end thereof the bottom end being positioned a distance above the rear end of said short conveyor and means whereby the lower end of said conveyor will yieldingly press the grain against the bottom of the trough while urging it upwardly.

2. A device as recited in claim 1 including; a guideway in rear of said roller adapted to prevent the grain from winding around said roller and forming a support for the grain as it leaves the top of the roller and moves to the bottom of said trough.

3. A device as recited in claim 1 including; a beater positioned between the upper end of said endless elevator and said cylinder and a distance above the apex formed by said upwardly and downwardly extending portions and being adapted to direct the grain toward the cylinder.

4. A device as recited in claim 1 including; said trough at its front end extending a distance above the top plane of said longitudinal conveyor.

5. A device as recited in claim 1 including; said trough being divided adjacent said driving roller and having a telescoped joint therebetween and being pivoted together on the axis of said driving roller.

6. A harvester elevating device of the class described, comprising an upwardly extending trough having at its upper end a relatively short upwardly and rearwardly and then downwardly and rearwardly extending extension, a threshing cylinder having a concave, the forward end of which registers with the rear end of said extension, an endless chain conveyor having spaced transverse flights positioned in said trough, the upper end terminating a distance from the front of said cylinder and above said extensions, a beater positioned midway the space between said elevator and cylinder and a distance above the apex formed by said extensions and adapted to urge the approaching grain toward said cylinder, said flights adapted to press the grain against the bottom of said trough to thereby elevate the grain, the lower end of said conveyor having a relatively large diameter to thereby form a deep and gradually reduced throat to thereby receive loose grain but gradually compress it until it reaches the bottom of said trough.

7. A harvester elevating device of the class described, comprising an upwardly extending trough, an endless chain elevator having spaced transverse flights positioned in said trough, the lower ends of the chains of said elevator engaging relatively large in diameter sprockets, the lower end of said trough on its bottom having a short forwardly extending portion terminating in a sharp receding offset, a roller positioned adjacent said offset, a horizontal conveyor positioned a distance below the bottom of said elevator terminating adjacent said roller, the lower end of said elevator adapted to press the grain against the delivery end of said conveyor and said forwardly extending portion and said roller, the top of said conveyor being somewhat below the horizontal plane of the top of said roller, said horizontal conveyor, roller and forwardly extending portion co-operating with the bottom of said elevator to form a gradually reduced and upwardly curved entrance way to said trough.

THOMAS CARROLL.